UNITED STATES PATENT OFFICE.

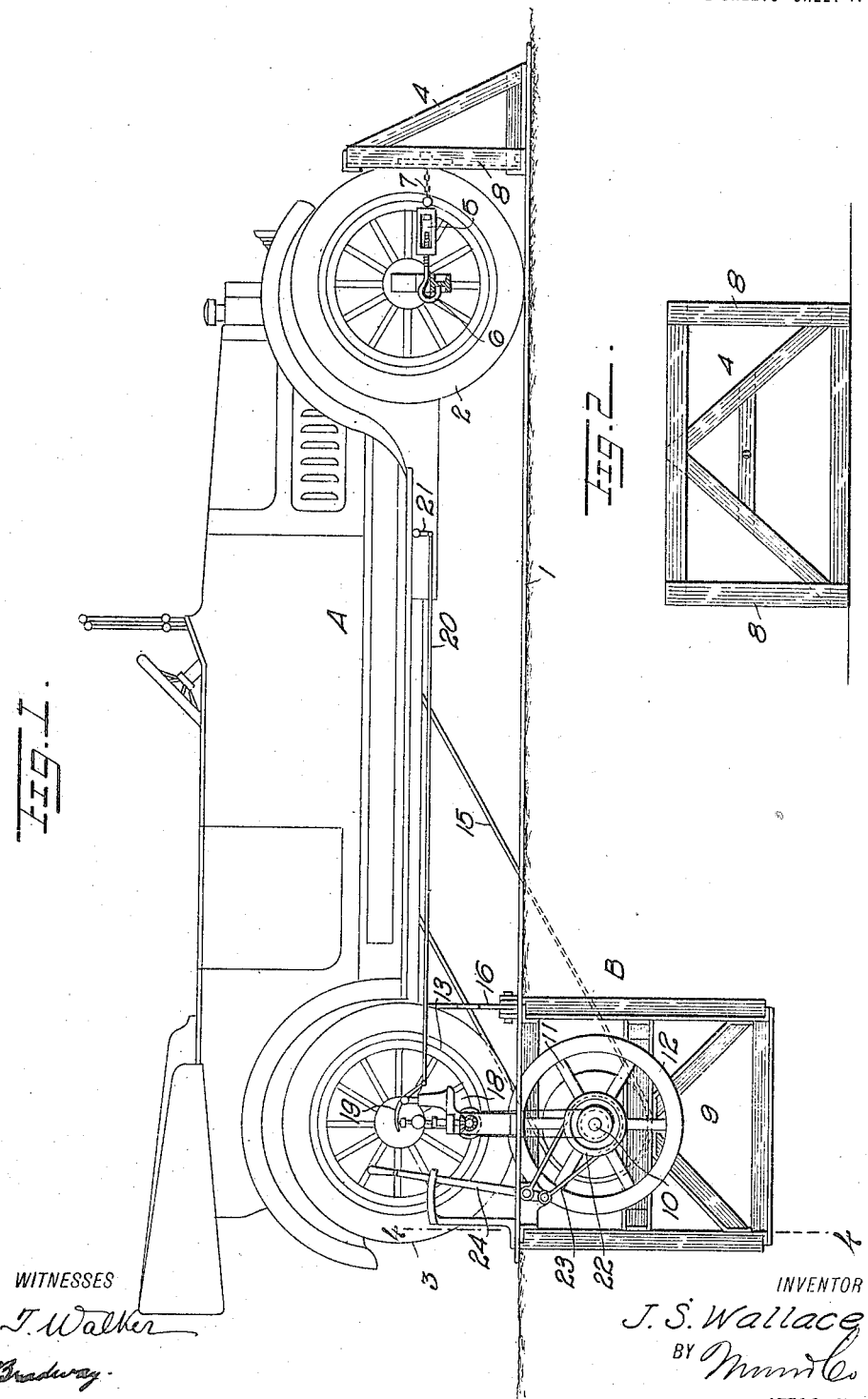

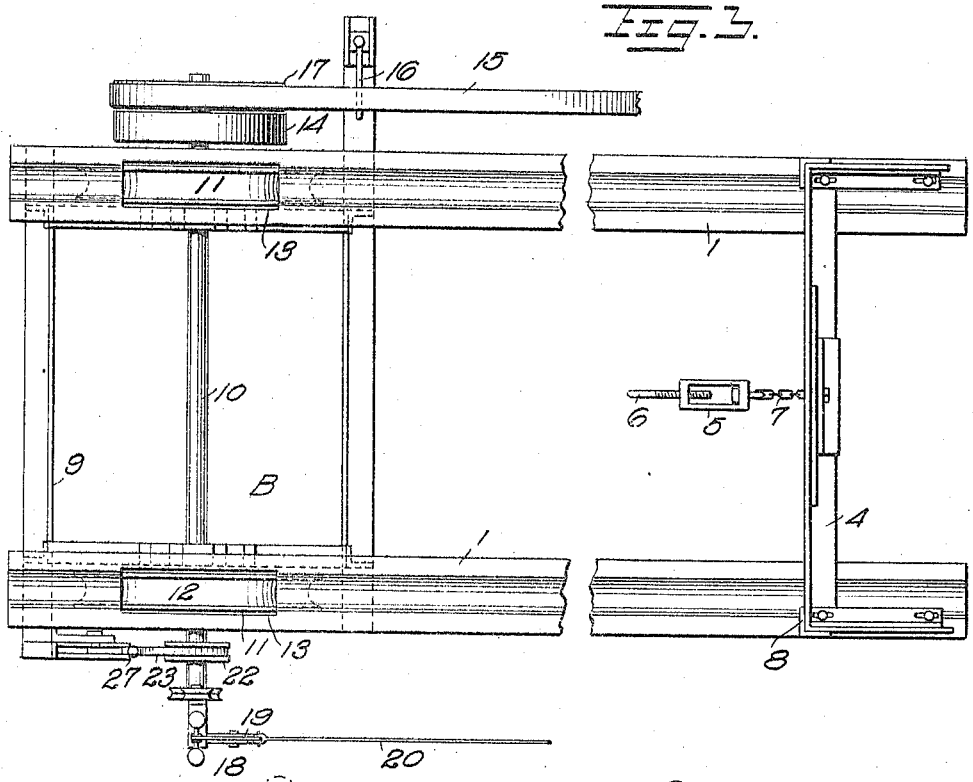
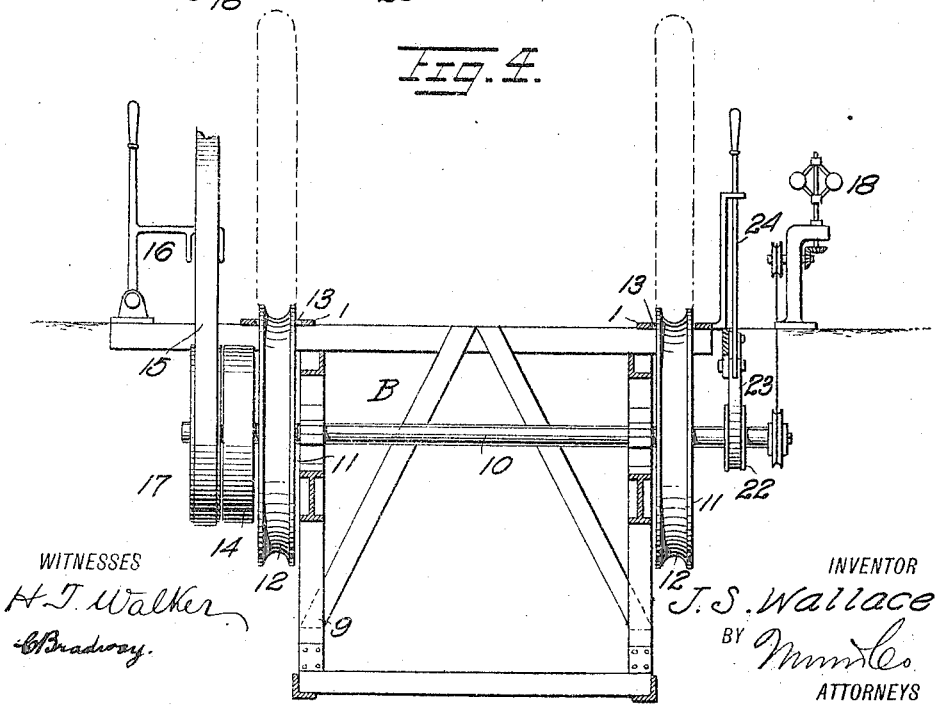

JOHN SHAW WALLACE, OF BURLINGTON, NORTH DAKOTA.

POWER TRANSMISSION.

1,180,092.  Specification of Letters Patent.  Patented Apr. 18, 1916.

Application filed November 6, 1915. Serial No. 60,061.

*To all whom it may concern:*

Be it known that I, JOHN S. WALLACE, a citizen of the United States, and a resident of Burlington, in the county of Ward and State of North Dakota, have invented a new and Improved Power Transmission, of which the following is a full, clear, and exact description.

This invention relates to power transmission mechanisms and pertains more particularly to a mechanism whereby power can be derived from an ordinary automobile for various purposes, as threshing grain, sawing wood, hoisting, pumping, generating electric current, and the like, especially on farms.

The invention has for its general objects to improve and simplify the construction and operation of machines of the character referred to so as to be reliable and efficient in use, comparatively inexpensive to manufacture and install, and so designed that an automobile can be easily and quickly brought into operative relation with the apparatus.

A more specific object of the invention is the provision of a power transmitting apparatus which includes track rails for the wheels of the automobile and under which are wheels having concave fellies for frictional engagement with the rear wheels of the automobile that rest thereon, whereby power can be taken off from the automobile while the latter is stationary on the track rails, and this power can be utilized for any desired purpose, there being automatic means for controlling the speed of the engine, and the structure also includes a hand-operated brake for stopping the apparatus. On the track rails is a buffer frame which is provided with means for engagement with the front part of the automobile so as to anchor the car at such position that the rear wheels will be directly over and resting on the grooved transmission wheels of the apparatus.

For a more complete understanding of the invention, reference is to be had to the following description and claims taken in connection with the accompanying drawings, which illustrate one embodiment of the invention and wherein similar characters of reference indicate corresponding parts in all the views, in which—

Figure 1 is a side view of the apparatus with an automobile positioned thereon for supplying power; Fig. 2 is a view of the buffer frame; Fig. 3 is a plan view of the apparatus with an intermediate portion broken away; and Fig. 4 is a sectional view on the line 4—4, Fig. 1.

Referring to the drawing, A designates an ordinary automobile from which power is derived and transmitted to any desired machinery to be driven through a transmitting mechanism B. This mechanism comprises a pair of track rails 1 which are preferably channeled so as to enable the wheels 2 and 3 of the automobile to run thereon to the proper position. At the front ends of the rails 1 is an upstanding buffer frame 4 of suitable construction which is provided with improvements for connection with the front part of an automobile. Such means comprises a turnbuckle 5 having a screw hook 6 which engages the front axle, and a chain or connecting element 7 which is fastened to the buffer frame. The vertical end members 8 of the frame are in line with the front wheels so as to be engaged by the latter when the anchoring device formed by the parts 5, 6 and 7 is connected with the front axle and tightened. The automobile is now prevented from moving either forwardly or backwardly, and while thus stationary it can be used for delivering power for any desired purpose.

Attached to the rear ends of the rails 1 and disposed under the same is a frame 9 of substantial and durable construction. In this frame is mounted a horizontal shaft 10 which has fastened thereto a pair of wheels 11 which have their rims 12 grooved so as to correspond to the curvature of the tires of the rear wheels 3, which latter rest on the tops of the wheels 11 when the automobile is properly positioned in the apparatus. These wheels 11 have their upper portions extending through openings 13 in the ends of the rails 1, and they support the wheels 3 off of the rails, whereby the rear wheels 3 can freely rotate under power from the engine of the automobile and deliver power to the wheels 11 and shaft 10. Power may be transmitted from the shaft 10 in any suitable manner, as, for instance, by a pulley 14 fastened on the shaft, and a belt 15 which can be transferred by a shifter 16 from the fixed pulley 14 to the loose pulley 17, and vice versa.

It is desirable to regulate the engine according to the load being driven, and for this purpose a governing device 18 is employed which comprises a centrifugal governor connected in any suitable manner with the shaft 10, as shown in Fig. 4, and the movable element of the governor will be operatively connected with the throttle of the automobile engine, as, for instance, by a lever 19, link 20, and arm 21 suitably connected with the throttle valve or other regulating means. By this automatic governing device the speed can be maintained substantially constant. On the shaft 10 is a brake wheel 22 with which is associated a brake band 23 connected with an operating lever 24, which lever, by being moved, will tighten the brake band so as to stop rotation of the shaft of the transmission.

A power transmitting apparatus of this character is of comparatively simple and inexpensive construction and can be readily transported to any desired point and set up for the purpose of threshing grain, sawing wood, pumping water, hoisting material into silos, hay-mows and the like, or generating power.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. An automobile-driven power transmitting apparatus comprising a rotatable element, means for taking off power therefrom, and a speed responsive device connected with the element, in combination with an automobile having its driving wheel or wheels operatively connected with the element, and means between the speed responsive device and engine of the automobile for controlling the speed thereof.

2. An automobile-driven power transmission apparatus comprising track rails for the wheels of an automobile, a buffer frame fastened to the front ends of the rails, means on the frame for anchoring an automobile thereto, a frame fastened to the rear ends of and disposed under the rails, a shaft mounted in the frame, wheels on the shaft which have their top portions disposed at the rails for supporting the rear wheels of the automobile to receive power therefrom, means for transmitting power from the said shaft, and an automatic governing device connected with the shaft and operatively connected with the automobile for controlling the speed of the engine thereof.

3. An automobile-driven power transmission apparatus of the class described comprising a pair of rails, means at the front ends thereof for immovably holding an automobile on the rails, transmission wheels disposed under the rear ends of the rails and having their upper portions extending through the rails and so spaced from the said means that the rear wheels of an automobile would rest on the said wheels, a shaft on which the transmission wheels are mounted, means for taking off power from the said shaft, an automatic speed controlling means adapted to be operatively connected with the engine of an automobile for regulating the speed thereof, and a hand-operated brake associated with said shaft.

4. An automobile-driven power transmission apparatus of the class described comprising means for holding an automobile immovable, transmission wheels on which the rear wheels of the automobile are adapted to bear and transmit power thereto, means for delivering power from the transmission wheels, a speed responsive device connected with the said transmission wheels, and means operated by the speed responsive device for controlling the engine of the automobile.

In testimony whereof I have signed my name to this specification in the presence of two subscribing witnesses.

JOHN SHAW WALLACE.

Witnesses:
  H. A. KENVER,
  C. A. BUGGE.